United States Patent [19]

Rouillon

[11] Patent Number: 5,015,847
[45] Date of Patent: May 14, 1991

[54] DEVICE FOR MEASURING THE RADIOACTIVITY OF A LOAD OF ORE ON AN EXTRACTION MACHINE SUCH AS A MECHANICAL SHOVEL OR DIGGER

[75] Inventor: Christian Rouillon, Meung Sur Loire, France

[73] Assignee: Compagnie Francaise De Mokta, Cedex, France

[21] Appl. No.: 454,436

[22] Filed: Dec. 21, 1989

[30] Foreign Application Priority Data

Dec. 30, 1988 [FR] France ................................ 88 17481

[51] Int. Cl.$^5$ ............................ E02F 9/26; G01T 1/16
[52] U.S. Cl. .................................... 250/253; 37/117.5;
  37/DIG. 3; 37/DIG. 19; 250/255; 250/361 R;
  250/374
[58] Field of Search ................... 250/255, 253, 361 R,
  250/336.1, 363.01, 389, 374; 37/117.5, DIG.
  19, DIG. 3

[56] References Cited

U.S. PATENT DOCUMENTS

| 3,723,727 | 3/1973 | Wogman et al. | 376/158 |
| 4,135,632 | 1/1979 | Berkel, Jr. | 414/698 |
| 4,590,377 | 5/1986 | Lukens | 250/361 R |

FOREIGN PATENT DOCUMENTS

| 678321 | 1/1966 | Belgium . |
| 1150345 | 1/1958 | France . |
| 60-208526 | 10/1985 | Japan . |

Primary Examiner—Constantine Hannaher
Attorney, Agent, or Firm—Fleit, Jacobson, Cohn, Price, Holman & Stern

[57] ABSTRACT

A device for measuring radioactivity for a machine for use in the extraction of radioactive ore and including at least one moving receptacle (18) suitable for containing a load of ore. The device comprises a rod (120) having its top end hinged to the machine in such a manner as to leave the rod free to swing in at least one vertical plane, the bottom end of the rod having a radioactive radiation detector (122) covering a determined solid angle, the device further including displacement means (140, 166) for bringing the rod and the receptacle in reproducible manner into a mutual disposition such that the load of ore contained in the receptacle occupies a substantial portion of the solid angle of the detector. An arm (110) is preferably provided between the rod and the machine.

16 Claims, 4 Drawing Sheets

U.S. Patent
May 14, 1991
5,015,847
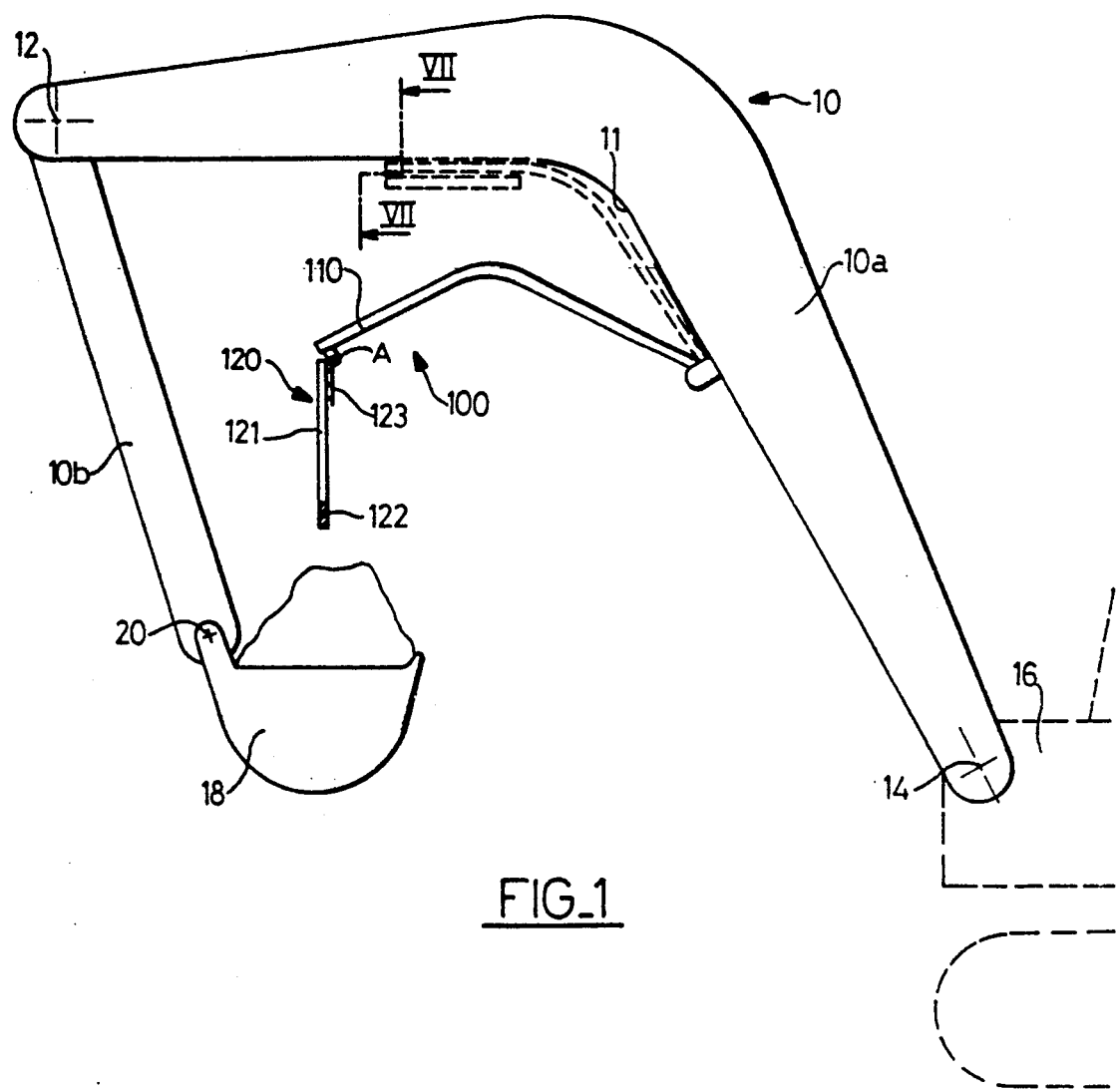
FIG_1
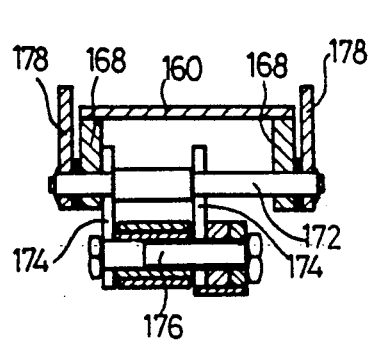
FIG_6
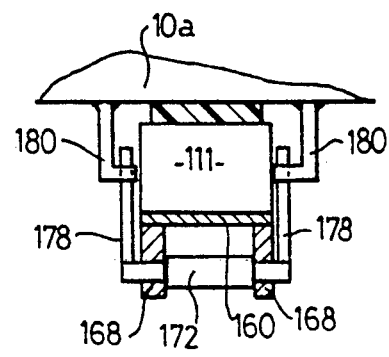
FIG_7

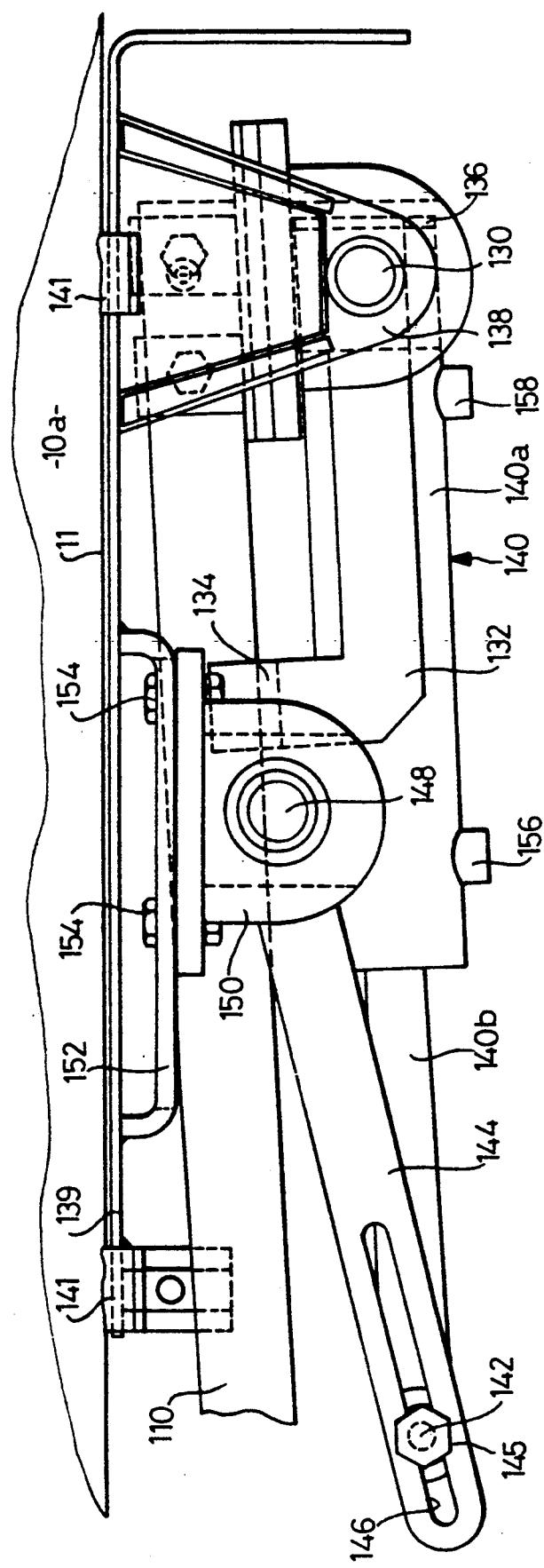
FIG_2

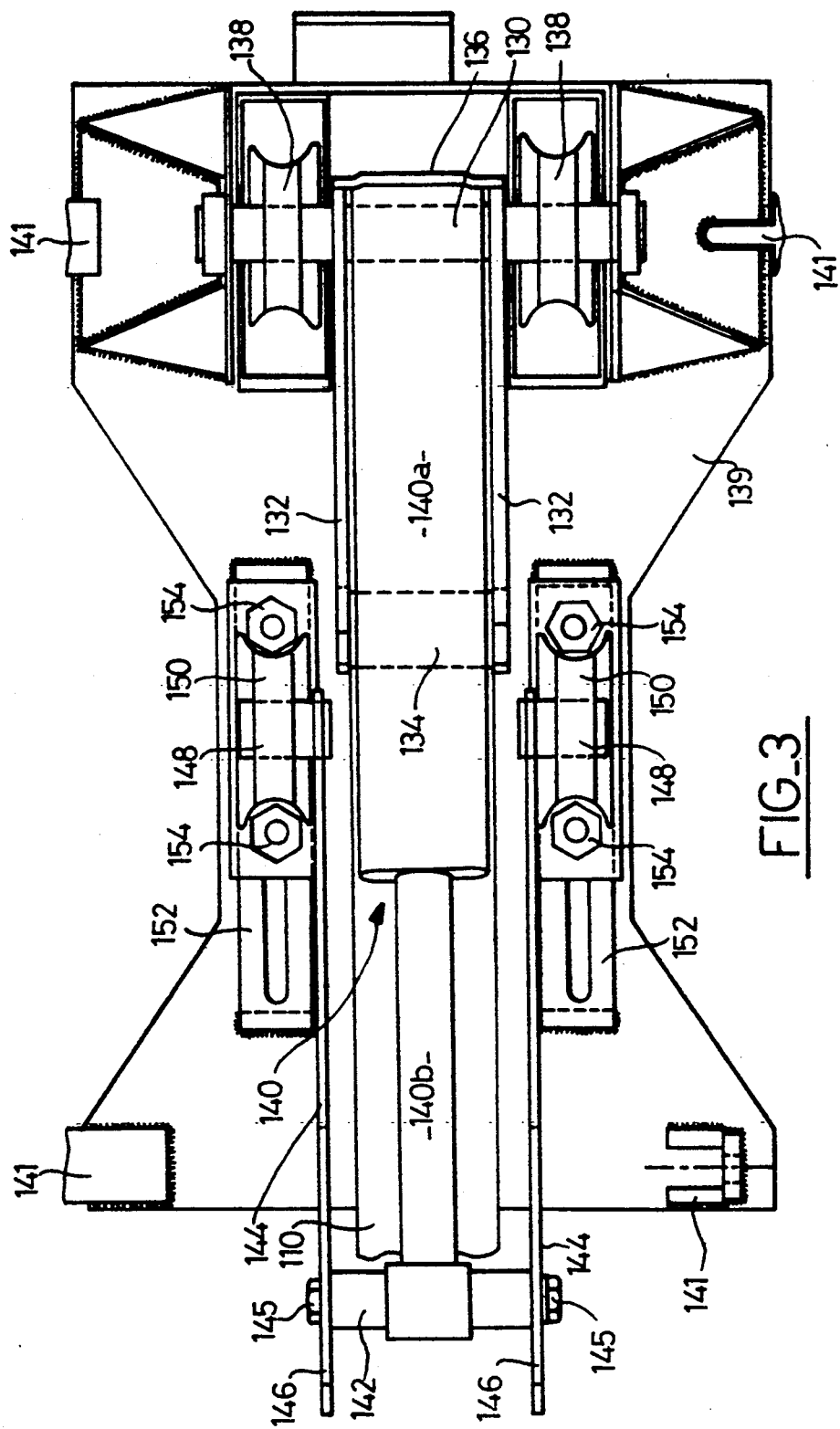

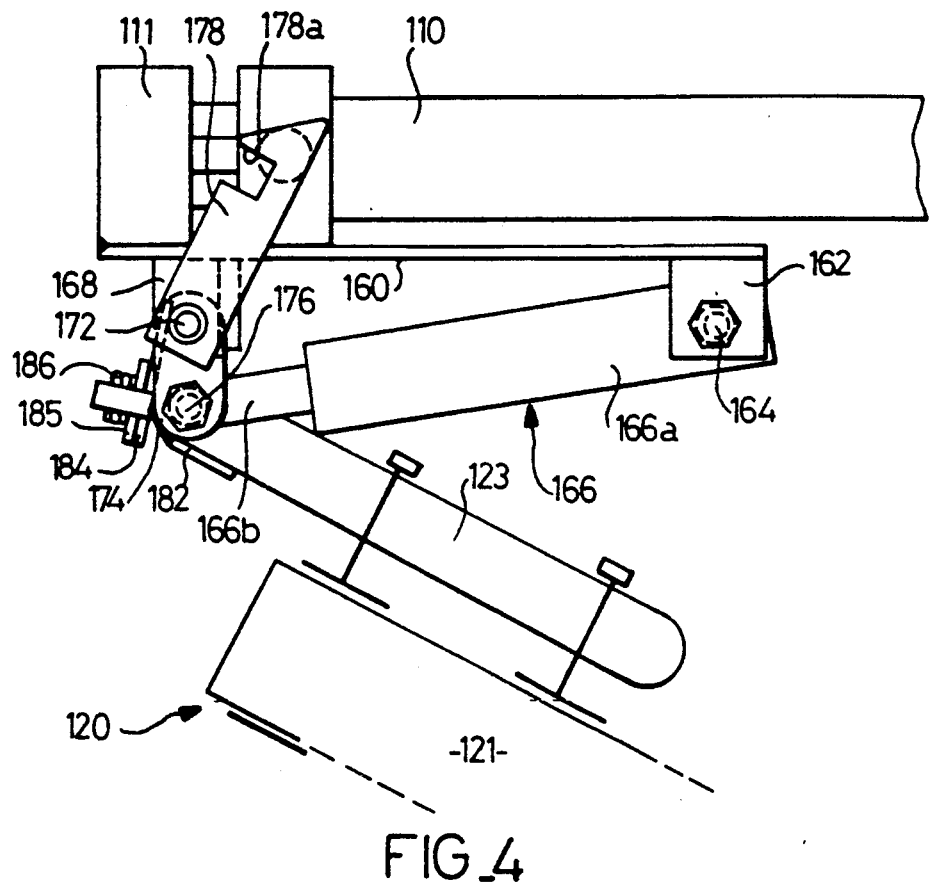
FIG_4
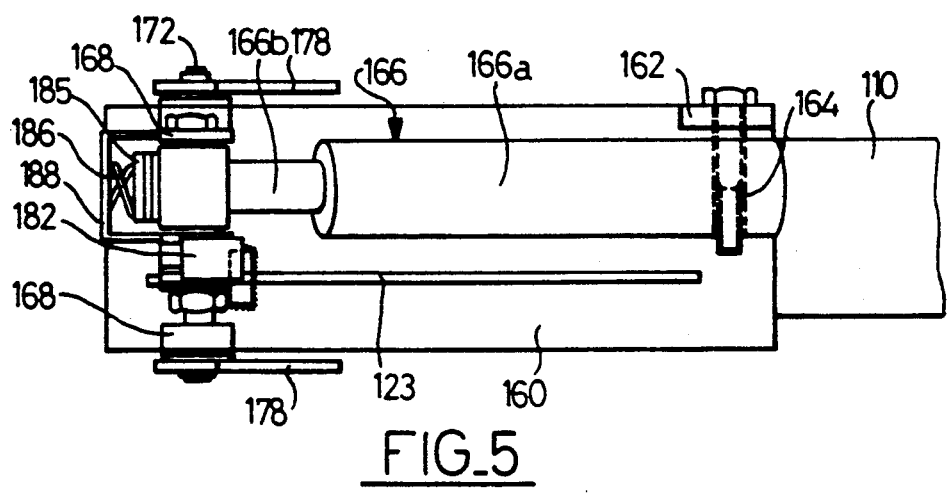
FIG_5

DEVICE FOR MEASURING THE RADIOACTIVITY OF A LOAD OF ORE ON AN EXTRACTION MACHINE SUCH AS A MECHANICAL SHOVEL OR DIGGER

The present invention relates in general to the field of exploiting radioactive ores, and it relates more particularly to a new device for measuring radioactivity for use on mining equipment while extracting radioactive ores.

BACKGROUND OF THE INVENTION

On a site for working radioactive ores, it is common practice from time to time to measure abundance by measuring the radioactivity of the extracted ore. Such measurement is used mainly for sorting ore into grades of different abundances, and in order to eliminate ore which is considered as being sterile or too poor, while also making it possible to obtain an indication about the production from a site over a given period of time by summing all of the measurements performed. Overall, such measurements serve to optimize the working of a quarry.

In general, prior measurement devices comprise a radiation-measuring gate of such a size as to enable dumper trucks or other ore-conveying machinery to pass through the gate, with the gate including one or more top cross-members having various radioactivity detectors mounted thereon. The detectors may be Geiger-Muller tubes or monocrystal scintillation meters suitable for detecting the gamma rays given off by the load and related to an appropriate counter. After a predetermined exposure time, e.g. a few seconds, the counter gives an indication on the abundance of radioactive elements in the ore contained in the bin of the machine.

However, radioactivity measuring gates suffer from several drawbacks.

Firstly, the measurement of radioactivity as obtained is extremely inaccurate. For a mass of several tens of tons of ore in the bin of a truck, only those gamma rays coming from the top layer of the ore (over a thickness of about 60 cm) escape from the mass and reach the detectors at the top of the gate. It will be understood that in the specific case of the mass of ore in the bin being non-uniform, measurement errors can be considerable.

In addition, calibrating any type of device for measuring radioactivity requires sampling campaigns that are very burdensome and expensive. For example, with a radioactivity measuring gate, it is necessary to process about 30 bin loads each weighing 25 to 30 tons during one such campaign, thereby obtaining a statistical curve of radioactivity as a function of abundance in the ore which is good enough for the gate to be useful in practice.

Finally, radioactivity measuring gates are expensive, and as a result it is not uncommon for there to be too few gates provided in any one quarry. In practice, this gives rise to lines of waiting trucks or other machines queuing up to go through the gate, thereby reducing productivity.

Attempts have long been made in vain to fit the shovels or buckets of ore-extracting machines with devices for measuring the radioactivity of a load of ore contained therein. However these attempts have given rise to failures. More precisely, currently available gamma ray detectors are all relatively fragile in structure and they do not withstand the rough working conditions to which a hydraulically operated shovel or other comparable machine is subjected in operation.

Consequently, research directed towards this type of measurement has now been abandoned.

By going against this trend in the art, the Applicant has nevertheless sought to develop a machine-mounted measurement device which is effective in the difficult environment of a quarry. This research has lead to the present invention.

SUMMARY OF THE INVENTION

The present invention thus provides a device for measuring radioactivity for a machine for use in the extraction of radioactive ore and including at least one moving receptacle suitable for containing a load of ore, the device comprising a rod having its top end hinged to the machine in such a manner as to leave the rod free to swing in at least one vertical plane, the bottom end of the rod having a radioactive radiation detector covering a determined solid angle, the device further including displacement means for bringing the rod and the receptacle in reproducible manner into a mutual disposition such that the load of ore contained in the receptacle occupies a substantial portion of the solid angle of the detector.

Other preferred, but optional features of the device of the invention are as follows:

the detector is a gamma radiation detector, e.g. a Geiger-Muller counter, a scintillation meter, or a scintilator having a mineral monocrystal;

it is additionally provided with an arm pivotally mounted on the machine at one end and having the rod articulated to its other end, preferably, this arm is mounted on the bottom surface of a receptacle-displacing boom of the machine;

the displacement means include two actuators provided for displacing the arm and the rod between a stowed position in which the rod is folded against the arm and the arm is folded against the bottom surface of the boom of the machine, and a utilization position in which the arm is at a determined angle relative to the boom, and the rod hangs freely in said vertical plane; in which case, the vertical plane of the swinging connection also constitutes the said plane in which the arm of the device is free to swing;

means for mechanically locking the arm and the rod in the stowed position and controlled by the second actuator, together with means for adjusting the angular position of the arm of the device in storage and utilization positions respectively, may also be provided;

the arm has a telescopic extension at its rod end with the hinge of said rod being mounted thereon; and the rod is mounted on its hinge via an assembly piece, and the displacement means comprise, in association with the second actuator, a pivoting retention plate which functionally engages said part only during the transition stages of the device between its stowed and utilization positions.

The measurement device of the present invention has the following advantages:

quantities of ore that are completely sterile or so poor that their abundance is below the economic limit can be eliminated rationally in far smaller batches than in the prior art, and they can be eliminated before being loaded onto a truck;

the ore is separated into grades having different abundances both more flexibly and more accurately, this facilitates adjusting the feed to subsequent treatment installations, and also the allocation of different grades to different treatments;

by observing the abundance in each bucketful (a few m³) it is possible to measure production much more accurately, and therefore optimization of production is facilitated;

there is a saving in manpower since the driver of the machine can now operate more independently from the geological overseer, and without wasting time;

above all, as mentioned above, sampling campaigns can be performed much more easily and more precisely given the reduced volume of each sample; and finally, the present invention makes it possible to do away completely with prior art gates.

BRIEF DESCRIPTION OF THE DRAWINGS

An embodiment of the invention is described by way of example with reference to the accompanying drawings, in which:

FIG. 1 is a diagrammatic elevation side view of a measurment device of the present invention, illustrating the basic principle thereof;

FIG. 2 is an elevation side view of a first detail of the FIG. 1 device;

FIG. 3 is a view of the FIG. 2 detail seen from below;

FIG. 4 is an elevation side view of a second detail of the FIG. 1 device;

FIG. 5 is a view of the FIG. 4 detail seen from below;

FIG. 6 is a cross-section through the detail of FIGS. 4 and 5; and

FIG. 7 is a cross-section view through a detail taken on line VII—VII of FIG. 1.

DETAILED DESCRIPTION

With reference initially to FIG. 1, there can be seen the two-part arm 10 of a hydraulic digger which is conventionally constituted by two parts 10a and 10b. The two parts 10a and 10b are articulated to each other at 12. The main arm or "boom" 10a is also articulated to the chassis 16 of the digger at 14. The digger also includes a bucket 18 articulated to the bottom end of the arm 10b at 20.

Hydraulic actuators (not shown) are conventionally provided for controlling the various movements of the arms and the bucket.

In accordance with the present invention, the boom 10a has a device for measuring radioactivity mounted thereon, which device is given an overall reference 100.

This device is essentially constituted by an arm 110 having one end articulated to the bottom face of the digger boom 10a, and a rod-shaped probe 120 mounted at the free end of the arm 110. In accordance with an essential aspect of the invention, the probe is mounted at the end of the arm via a hinged connection so as to swing pendulum-like. The probe portion 120 comprises a tube 121 of well-defined length with a radioactive radiation detector 122 recieved in the bottom end thereof, e.g. a gamma ray detector.

The tube 121 is hinged via an assembly piece 123 to the free end of the arm 110 about an axis which is perpendicular to the plane of the sheet of paper on which FIG. 1 is drawn. The tube 121 acts as a spacer between this articulation A and the detector 122 so that the detector is situated at a determined distance above the bucket 18 which is itself brought by the hydraulic circuit of the machine into a well determined position and orientation each time radioactivity is to be measured.

Thus, while hanging freely from the end of the arm 110 in a plane perpendicular to the axis A, the detector 122 is protected against any shock it may receive, in that it is free to move out of the way to the left or the right in FIG. 1 and then return under the effect of gravity to its vertical equilibrium position as shown. It is important to observe at this point that the articulated connection between the probe 120 and the arm 110 which is essentially rigidly connected to the machine serves to damp much of the vibration present in the machine while it is in operation.

The gamma ray detector which has the reputation of being fragile thus presents remarkable immunity relative to the outside environment, and it is the above-described mount for the detector which has made it possible for the first time to measure the radiation of each bucketful in an industrially exploitable manner.

In practice, tests have shown that such exploitation can be continued without failure over a long period of time.

The gamma detector 122 used is preferably a scintillator constituted by an ICs mineral monocrystal (TL) associated with a photodiode made of specially selected silicon and connected in conventional manner to a load preamplifier (not shown) whose output is connected via a cable to an appropriate counter system (not shown), situated in the driver's cab of the digger, for example. A detector of this type is advantageous in that being solid state it occupies very little volume, typically only a few cm³.

The counting system is preferably a digital counter selected for appropriate qualities of ruggedness, portability, lightness, compactness, and self-contained power supply. The counter is designed to store the measurements performed in association with identifiers, and subsequently to transfer them in series to a microcomputer for processing.

In a variant, or in addition, it is possible to provide the digger, e.g. on the roof of the cab, with a large size display device for indicating the measured radioactivity $\tau$ each time a bucketful is measured. In this way, the person in charge of operations is kept permanently informed about the category of the ore extracted, and can therefore direct each bucketful to an appropriate destination.

In theory, a gamma detector of the type described above is for use with ores having a uranium 238 concentration of about 300 parts per million (ppm) to 1000 ppm, using a bucket having a capacity of 2600 liters (l).

If it is desired to measure higher concentrations, when working richer deposits, would naturally be possible to replace a detector of this type by another type of detector, in particular a detector of the Geiger-Muller type. It is also possible to use a scintillon type scintillation meter.

The detector should preferably have a detection solid angle of about $\pi$ (a circular cone with an angle at the apex of 120°), with its detection axis being directed vertically downwards, and with the device then being designed to come into position immediately above the load contained in the bucket, as shown in FIG. 1. In a variant, it would naturally be possible to provide a detector operating over a solid angle of $4\pi$, in which case the device should be designed so that the rod 120 penetrates partially into the bulk of the ore so that the detector is situated inside the ore.

As can be seen in FIG. 1, the detection assembly 100 may take up an active position (solid lines) or a stowed position folded against the bottom surface of the boom arm 10a (dashed lines).

To this end, the shape of the arm 110 is locally curved so as to follow the curve of said bottom surface, and the probe 120 is designed to be folded (anticlockwise in FIG. 1) against the rectilinear section of the arm 110 adjacent to its free end.

A particular embodiment of the mechanical means used for performing the various movements of the measuring device of the invention is now described in detail with reference to FIGS. 2 to 7.

FIGS. 2 and 3 show the mechanism connecting the arm 110 to the boom 10a, together with the drive for the arm 110.

The end of the arm 110 furthest from the probe 120 is connected to a transverse horizontal hinge pin 130 via connection pieces 132, 134, and 136. The pin 130 is mounted in two bearings 138 rigidly connected to the bottom surface 11 of the boom 10a, e.g. by being welded to a support plate 139 which is itself removably fixed to the boom 10a via two appropriate fixing devices 141, e.g. clampable jaws.

A first hydraulic actuator 140 is pivotally mounted at its first or cylinder end 140a on the above-mentioned pin 130, and is constrained to rotate with the arm 110 in the region of the pin 130 by mechanical parts not described in detail. The free end of the rod 140b of the actuator 140 is pivotally mounted about a pin 142 in longitudinal slots 146 in two links 144. Nuts 145 lock the pin 142 in a determined position along the length of the slots 146. The links extend on either side of the arm 110 and their respective ends furthest from the slot 146 are pivotally mounted on two pins 148 received in two bearings 150 rigidly mounted on the support plate 139 in front of the pin 130.

The position of the pins 148 along the bottom surface 11 is adjustable, and two slideways 152 welded to the plate 139 are provided for this purpose, with the bearings 150 being slidably mounted in the slideways and capable of being locked in a selected position by means of bolts 154.

The first actuator 140 is advantageously connected at 156 and 158 to the hydraulic circuit of the digger.

By being able to adjust the pivot point of the actuator rod 140b relative to the links 144 and the pivot point of said links 144 relative to the boom 10a, it is advantageously possible to adjust the angular positions in which the arm 110 is stowed and maximally extended, respectively, relative to the boom 10a, thereby determining the height of the probe 120 above the bucket whose load is to be scanned.

This mechanism operates as follows: in the position shown, the actuator rod 140b is maximally extended such that the links and the actuator take up the position shown in FIG. 2 by means of the various hinges. Thus, the actuator 140, and consequently the adjacent section of the arm 110 of the measurement device, are substantially parallel to the bottom surface 11 of the boom, which corresponds to the stowed position (shown in dashed lines in FIG. 1).

When the actuator rod is retracted, this motion is necessarily accompanied by the actuator pivoting about the pin 130 and by the links pivoting about pins 148 in an anticlockwise direction, thereby increasing the angle between these two parts. The pivoting of the actuator 140 causes the arm 110 to pivot in the same direction and through the same angle until at maximum retraction of the rod 140b, the arm 110 is in its maximally extended position, which is the position in which measurement may be preformed.

FIGS. 4 to 7 show the mechanism provided for connecting the probe 120 to the free end of the arm 110 and for driving said probe.

Firstly, the length of the arm 110 may be modified, and it includes a telescopic extension 111 for this purpose. This makes it possible to adjust the position of the probe 120 so as to bring it exactly vertically over the load of ore to be scanned. The extension 111 has a plate 160 welded thereon, which plate extends rearwards (towards the right in FIG. 4) substantially parallel to the adjacent section of the arm 110. A bearing 162 is provided at the rear end of the plate 160 and receives a hinge pin 164 for the cylinder 166a of a second hydraulic actuator 166 which is preferably controlled by the hydraulic circuit of the machine. In addition, near its front end, the plate 160 includes two bearings 168 welded thereto and receiving a hinge pin 172. Two short links 174 are pivotally mounted on this pin and their bottom ends carry another hinge pin 176 engaged in two holes provided therein.

In addition, two hooks 178 are rigidly mounted on the pin 172 for purposes explained below. Each of the hooks 178 has a notch 178a suitable, in a certain position, for receiving a respective locking pin 180 (see FIG. 7) welded to the bottom surface 11 of the boom 10a in the region thereof situated vertically thereabove.

The rod 166b of the actuator 166 is hinged at its free end to the pin 176. A first end of the support part 123 for the probe 120 is freely pivoted about the same pin. This part 123 includes fastening means, e.g. clamping collars or the like for fixing the tube 121 of the probe 120 thereto.

A retaining plate 182 is fixed, e.g. by welding to the short links 174 and the part 123 may bear against the plate 182 under gravity.

Finally, a thrust plate 184 is welded on the pin 172 and extends the actuator rod 166b. This plate which pivots together with the pin 172 is subjected to thrust via a washer 185 from a spring 186 situated on the opposite side to the hinge 176 and bearing against the bottom of a cradle 188 (see FIG. 5) held by the pin 176. The plate 184 and the hooks 178 described above occupy a well-determined angular position relative to one another.

This mechanism operates as follows. It should be understood that in the position shown in FIG. 4 the actuator 166 is in an intermediate position.

When the actuator 166 is deployed from its completely retracted position in which the probe 120 is folded against the adjacent section of the arm 110 and the locking pins 180 are engaged in the notches 178a of the hooks 178, the free end of the actuator rod 166b initially exerts thrust against the plate 184 which, by overcoming the force of the spring 186, causes the pin 172 to pivot, thereby pivoting the two hooks 178 in a clockwise direction through a sufficiently large angle to enable the notches to release the locking pins 180. The measurement device is thus released from its stowed position.

As the actuator rod continues its displacement, it causes the short links 174 to pivot, thereby pivoting the retaining plate 182 in a clockwise direction. The part 123 and the probe 120 also follow this movement under gravity and the actuator is driven until the probe 120 reaches its vertical position for performing measurements.

The stroke of the actuator 166 is adjusted so that the retaining plate 182 pivots sufficiently far beyond the vertical to leave the probe with sufficient clearance to swing in both directions, firstly so as to minimize the stresses to which it is subjected in the event of shock, and secondly so as to absorb some of the vibration present in the machine in the articulation at the hinge 176.

Thus, when the actuator is fully deployed, the probe 120 is attached to the arm 110 via a swinging connection and it stabilizes under gravity in a vertical position in order to measure radioactivity.

In order to stow the measurement device, the actuator 166 is retracted and the above-described operations take place in reverse order, terminating with the device as a whole being locked into position by the hooks 178.

A radioactivity measurement cycle using the device of the invention is now described in detail.

Initially, the driver operates a switch in the cab for lowering the probe. This begins by causing the actuator 166 to be operated, thereby unhooking the arm 110 of the device from the bottom face of the boom 10a. The hydraulic circuit of the digger is also automatically controlled so that the bucket 18 takes up a well determined position relative to the boom 10a, which position is shown in FIG. 1. This ensures that measurements are reproducible.

Simultaneously or thereafter the arm 110 is lowered by means of the actuator 140 and the actuator 166 continues its motion so as to lower the probe 120. This motion continues until the probe can swing freely about the hinge 176, and when the probe has stabilized, the detector 122 occupies a determined and invariable position relative to the bucket 18. For example, the device as a whole may be dimensioned or adjusted so that the detector is situated at a short distance above the top of the load contained in the bucket.

The driver then switches on the radioactivity counter system which is preferably situated in the cabin and which operates for a well determined period of time, e.g. 5 seconds.

When counting is over, the driver, and possibly also the overseeing sampler, can see the measured radioactivity of the ore contained in the bucket and can therefore give it an appropriate category and take the necessary action (load it onto a specific truck, reject it, etc. . . ).

The driver then actuates a switch for stowing the probe. Simultaneously or one after the other, the actuators 166 and 140 displace the probe relative to the arm 110 and the arm 110 relative to the boom 10a so as to fold the probe against the arm 110 and the arm 110 against the boom.

The device then returns to the position shown in dashed lines in FIG. 1 (its raised position) in which the above-described hooking system operates to ensure that the device is securely fixed in this position.

It may be observed that the device then occupies a very small amount of space along the bottom surface of the boom and constitutes no impediment to subsequent movements of the digger for emptying the load in the bucket and for digging a new load. In addition, when in this position, the measurement device is relatively well protected.

Naturally, numerous variants may be applied to the invention as described without going beyond the scope of the invention.

For example, in order to reduce the shocks inflicted on the measurement device as much as possible, shock-absorbing pads made of rubber of the like may be provided where the device engages the bottom surface of the boom (between the plate 139 and the surface 11). Similarly, a plate of rubber or the like may be provided on the bottom surface of the boom 10a as shown at 190 in FIG. 7, i.e. where the free end of the arm 110 hooks on when in its high position by means of the hooking device. In this way, the various shocks imparted to the boom during digging are absorbed as much as possible by the plate and are therefore not transmitted to the detector.

In addition, one or more weights may be provided within the tube 121, thereby changing the weight and the center of gravity of the probe 120 and also modifying its swinging behavior in desired manner.

Further, not only may the radiation detector 122 be of any type, it may also be accompanied by any known type of device e.g. collimators or screens for modifying the solid angle it covers in order to match it to the size of the load contained in the bucket.

It is clear that the invention is not limited to measuring radioactivity in the buckets of mechanical diggers. The person skilled in the art will be able to make the necessary adaptations to incorporate the measurement device of the present invention in any other machine capable of holding a load of ore in a bucket or in some other container, e.g. a loader.

Finally, although the invention is advantageously applicable to extraction in uranium quarries, it may naturally be applied to working any ore which can be categorized by measuring radioactive radiation emitted thereby.

In this respect, the device of the present invention may be provided either in the form of a self-contained unit suitable for being removably fixed on a given type of machine, or else it may be in the form of a unit which is optionally integrated in the machine during construction thereof.

I claim:

1. A device for measuring radioactivity for a machine for use in the extraction of radioactive ore and including at least one moving receptacle suitable for containing a load of ore, wherein the device comprises a rod having its top end hinged to the machine in such a manner as to leave the rod free to swing in at least one vertical plane, the bottom end of the rod having a radioactive radiation detector covering a determined solid angle, the device further including displacement means for bringing the rod and the receptacle in reproducible manner into a mutual disposition such that the load of ore contained in the receptacle occupies a substantial portion of the solid angle of the detector.

2. A device according to claim 1, wherein the detector is a gamma radiation detector.

3. A device according to claim 2, wherein the detector is selected from the group constituted by: Geiger-Muller counters; scintillation meters; and mineral monocrystal scintillators.

4. A device according to claim 1, further including an arm pivotally mounted at one end on the machine and having the rod hinged to its other end.

5. A device according to claim 4, wherein the arm is mounted on the bottom surface of a boom provided on the machine for displacing the receptacle.

6. A device according to claim 5, wherein the displacement means are provided for displacing the arm and the rod between a stowed position in which the rod is folded against the arm and the arm is folded against the bottom surface of the boom of the machine, and a utilization position in which the arm is at a determined angle relative to the boom, and the rod hangs freely in said vertical plane.

7. A device according to claim 6, wherein the displacement means comprise a first actuator acting between the machine and the arm, and a second actuator acting between said arm and the rod.

8. A device according to claim 7, also including mechanical locking means for locking the arm and the rod in the stowed position.

9. A device according to claim 8, wherein the mechanical locking means are controlled by the second actuator.

10. A device according to claim 7, wherein the rod is mounted on its hinge via an assembly piece, and wherein the displacement means include, in association with the second actuator, a pivoting retention plate which functionally engages said part only during the transition stages of the device between its stowed and utilization positions.

11. A device according to claim 6, wherein the said vertical plane also constitutes the plane in which the arm is pivotally mounted.

12. A device according to claim 6, including adjustment means for adjusting the angular position of the arm in its stowed position and its utilization position, respectively.

13. A device according to claim 4, wherein the arm has a telescopic extension at its rod end with the hinge of said rod being mounted thereon.

14. A device according to claim 1, wherein the displacement means include the means provided on the machine for displacing its receptacle.

15. A machine for use in the extraction of radioactive ore, wherein it is fitted with a device according to claim 1.

16. A machine according to claim 15, constituted by a mechanical digger, with the receptacle being constituted by the bucket.

* * * * *